(12) United States Patent
Kershaw et al.

(10) Patent No.: US 6,448,676 B1
(45) Date of Patent: Sep. 10, 2002

(54) PULSE WIDTH MODULATED ENGINE COOLING FAN MOTOR WITH INTEGRATED MOSFET

(75) Inventors: Peter Kershaw; Andrew Lakerdas; Marek Horski; John Makaran, all of London (CA)

(73) Assignee: Siemens Automotive Inc., Mississauga, CA (US)

( * ) Notice: Subject to any disclaimer, the term of this patent is extended or adjusted under 35 U.S.C. 154(b) by 0 days.

(21) Appl. No.: 09/573,839

(22) Filed: May 18, 2000

Related U.S. Application Data (60) Provisional application No. 60/134,654, filed on May 18, 1999, provisional application No. 60/164,160, filed on Nov. 8, 1999, and provisional application No. 60/183,914, filed on Feb. 22, 2000.

(51) Int. Cl.$^7$ .............................................. H02K 11/00
(52) U.S. Cl. ...................................... 310/68 R; 310/64
(58) Field of Search ................................ 310/68 R, 89, 310/64

(56) References Cited

U.S. PATENT DOCUMENTS

| | | | |
|---|---|---|---|
| 3,573,516 A | 4/1971 | Lyon | 310/68 |
| 4,198,583 A | 4/1980 | Anderson et al. | 310/71 |
| 4,239,319 A | 12/1980 | Gladd et al. | 339/147 R |
| 4,599,548 A | 7/1986 | Schulz | 318/599 |
| 4,665,350 A | 5/1987 | Angi et al. | 318/254 |
| 4,668,898 A | 5/1987 | Harms et al. | 318/254 |
| 4,673,851 A | 6/1987 | Disser | 318/341 |
| 4,727,274 A | 2/1988 | Adam et al. | 310/239 |
| 4,806,841 A | 2/1989 | Lee et al. | 322/29 |
| 4,963,778 A | 10/1990 | Jensen et al. | 310/68 D |
| 5,006,744 A | 4/1991 | Archer et al. | 310/89 |
| 5,008,574 A | 4/1991 | Kitahata | 310/68 D |
| 5,063,317 A | 11/1991 | Bruhn | 310/91 |
| 5,119,466 A | 6/1992 | Suzuki | 388/831 |
| 5,148,354 A | 9/1992 | Roth | 361/400 |
| 5,238,429 A | 8/1993 | Margrave et al. | 439/620 |
| 5,248,910 A | 9/1993 | Yockey et al. | 310/68 R |
| 5,268,605 A | 12/1993 | Bradfield | 310/71 |
| 5,317,669 A | 5/1994 | Anderson et al. | 388/829 |
| 5,410,229 A | 4/1995 | Sebastian et al. | 318/434 |
| 5,526,460 A | 6/1996 | DeFrancesco | 388/831 |
| 5,528,093 A | 6/1996 | Adam et al. | 310/89 |
| 5,563,462 A | 10/1996 | Strobl et al. | 310/71 |
| 5,616,975 A | 4/1997 | May et al. | 310/89 |
| 5,656,878 A | 8/1997 | Nakata | 310/71 |
| 5,677,605 A | 10/1997 | Cambier et al. | 318/254 |
| 5,677,616 A | 10/1997 | Ooiwa | 322/17 |
| 5,780,953 A | 7/1998 | Umeda et al. | 310/263 |
| 5,798,584 A | 8/1998 | Schaeffeler et al. | 310/50 |
| 5,825,108 A | 10/1998 | DeFilippis | 310/67 R |
| 5,852,338 A | 12/1998 | Boyd, Jr. et al. | 310/89 |
| 5,872,411 A | 2/1999 | Nakata | 310/71 |
| 5,889,922 A | 3/1999 | Bufe et al. | 388/804 |
| 6,285,100 B1 * | 9/2001 | Pflueger et al. | 310/68 D |

FOREIGN PATENT DOCUMENTS

GB 2 289 581 A * 11/1995

* cited by examiner

*Primary Examiner*—Karl Tamai
*Assistant Examiner*—Judson H. Jones (57) ABSTRACT

An electric motor 10 includes a motor housing 12 defining an internal cavity 15. A brush card assembly 24, a commutator 26 and an armature assembly 18 are provided in the cavity 15. The commutator 26 cooperates with the brush card assembly 24 to resupply electric current to the armature assembly 18. Permanent magnet structure 44 is provided in the housing 12 to generate a magnetic field to cause rotation of the armature assembly 18. A FET 52 is mounted with respect to the housing 16 so as to be in heat exchange relation therewith. A gate terminal G of the FET is constructed and arranged to receive pulse width modulation output from an electronic control unit 64 which is remote from the motor so as to enable able the motor to operate at more than one speed. A method of integrating a FET in a motor is also provided.

40 Claims, 7 Drawing Sheets

PULSE WIDTH MODULATED ENGINE COOLING FAN MOTOR WITH INTEGRATED MOSFET

This invention is based on and claims the benefit of U.S. Provisional Application No. 60/134,654, filed on May 18, 1999, and U.S. Provisional Application No. 60/164,160, filed on Nov. 8, 1999, and U.S. Provisional Patent Application No. 60/183,914 filed Feb. 22, 2000 the content of which is incorporated into the present specification by reference.

BACKGROUND OF THE INVENTION

The present invention relates generally to electric motors for automobile applications and, more particularly, to permanent magnet, brush-type, direct current motors which utilize pulse width modulation for speed control.

A significant challenge of permanent magnet, brush-type, direct current motors is to achieve different speeds of operation. Wound field-type motors generally can have speed controlled by altering the field flux. This is done by changing the current or the number of coil turns in the field winding. Since permanent magnet motors have a constant field flux, they cannot achieve speed control by field flux variation.

Often, permanent magnet motors used in automotive applications require the use of more than one speed, usually requiring a lower speed for general purpose operation and a maximum speed for worst case operation. Typically, multiple speeds have been achieved in permanent magnet motors by adding a resistor in series with the motor, switching out brushes (lap wound motor), adding a third brush (short-out coils) or using external electronic control such as analog devices or pulse width modulation.

U.S. Pat. No. 5,119,466 uses pulse width modulation to control the speed of a permanent magnet dc motor. A speed control circuit is carried by a circuit board disposed within the motor. The circuit board includes a motor control signal converter which receives a motor control signal from a vehicles electronic control unit (ECU) and sends a pulse width modulated signal to a field effect transistor (FET), which is also mounted on the circuit board and joined to a projection of the case of the motor. However, the requirement of the circuit board having a signal converter and FET mounted thereon increases the motor cost and the dissipation of heat created by the FET can be improved.

Another known arrangement provides a FET in a separate housing for modulating power to the motor based on a PWM signal from the ECU. However, this arrangement introduces another component mounted in an already crowded engine compartment.

Accordingly, there is a need to provide a direct current permanent magnet motor which utilizes pulse width modulation for speed control and has a metal oxide semiconductor FET (MOSFET) integrated therewith, without requiring a speed control circuit board within the motor.

SUMMARY OF THE INVENTION

An object of the invention is to fulfill the need referred to above. In accordance with the principles of the present invention, this objective is achieved by providing an electric motor including a motor housing defining an internal cavity. A brush card assembly, a commutator and an armature assembly are provided in the cavity. The commutator cooperates with the brush card assembly to supply electric current to the armature assembly. Permanent magnet structure is provided in the housing to generate a magnetic field to cause rotation of the armature assembly. A FET is mounted with respect to the housing and the FET has a gate terminal constructed and arranged to receive a pulse width modulated output directly from an electronic control unit which is remote from the motor so as to enable able the motor to operate at more than one speed.

In accordance with another aspect of the invention, a method of controlling speed of an electric motor is provided. The motor comprises a motor housing defining an internal cavity. A brush card assembly, a commutator and an armature assembly is provided in the cavity. The commutator cooperates with the brush card assembly to supply electric current to the armature assembly. Permanent magnet structure is provided in the housing to generate a magnetic field to cause rotation of the armature assembly. A FET is mounted with respect to the housing so as to be in heat exchange relation therewith. The method includes connecting a drain terminal of the FET to a negative lead of the brush card assembly. A source terminal of the FET is connected to a ground terminal or a negative terminal of the motor. A gate terminal of the FET is connected to a pulse width modulated output of an electronic control unit which is remote from the motor. A pulse width modulated signal is sent directly from the electronic control unit to the FET to control a speed of the motor.

In accordance with yet another aspect of the invention, a method of integrating a FET into a motor includes: providing a direct current motor comprising a motor housing defining an internal cavity; a brush card assembly, a commutator and an armature assembly being disposed in the cavity. The commutator cooperates with the brush card assembly to supply electric current to the armature assembly. Permanent magnet structure in the housing generates a magnetic field to cause rotation of the armature assembly. A connector structure is connected to the motor. The connector structure has a mounting surface. Spring structure is associated with the mounting surface. The FET is placed on the spring structure such that the spring structure is disposed between a surface of the FET and the mounting surface. The FET is electrically connected to the motor. An end cap is secured to the motor to close the cavity, with the spring structure forcing a surface of the FET into contact with a surface of the end cap such that heat generated by the FET is transferred directly to the end cap.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

Preferred embodiments of the invention are described in greater detail herein below with reference to the drawings wherein.

DETAILED DESCRIPTION OF THE PREFERRED EMBODIMENTS

In general, the electric motor of the present invention may be adapted for a number of different automotive applications including heat, ventilation, air conditioning systems, radiator engine cooling fans, etc.

Figure 1:
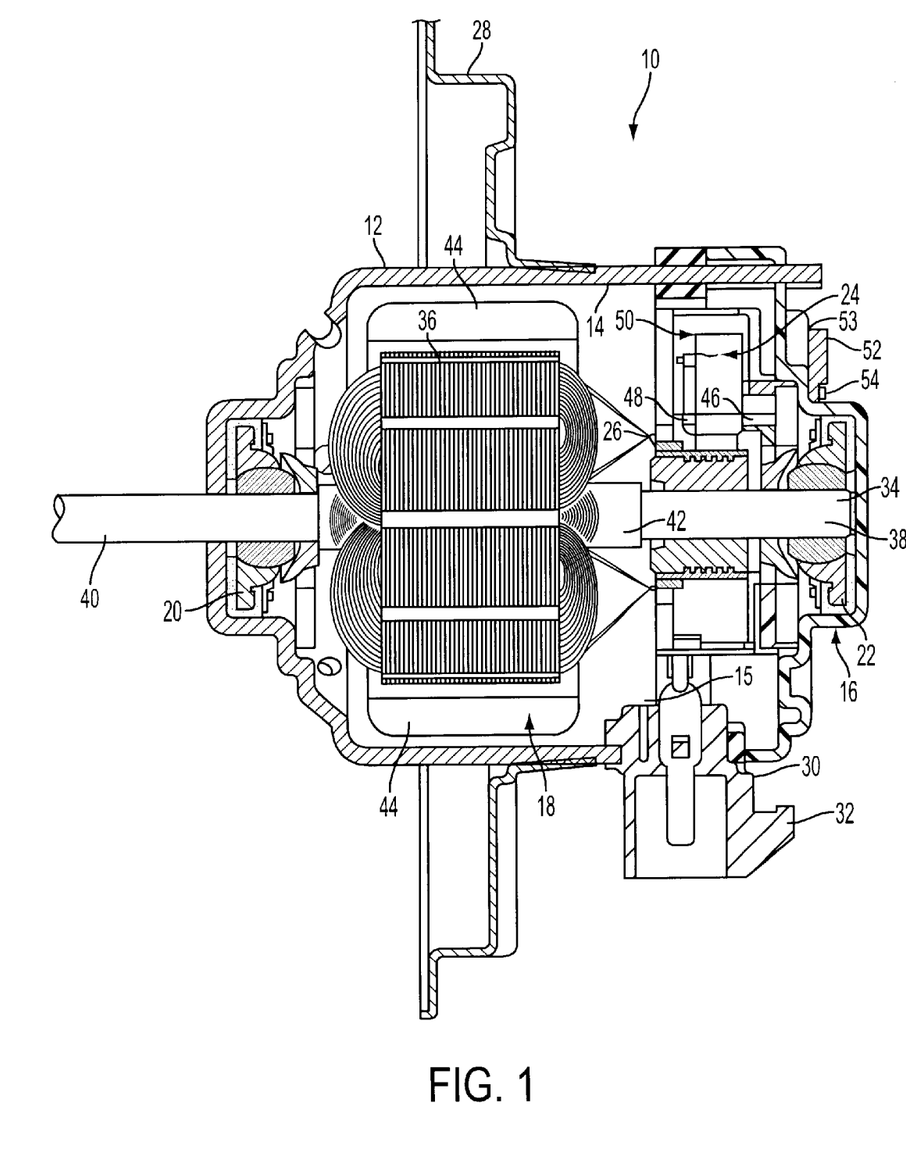
FIG. 1 is a side cross-sectional view of an electric motor having a MOSFET mounted on an end cap in accordance with the principles of the present invention.

Referring now in detail to the drawings wherein like numerals identify similar or like elements through the several views, FIG. 1 illustrates an electric motor, generally indicated at 10, provided in accordance with principles of the present invention.

The motor 10 includes a housing 12 defining an internal cavity 14 and having open end 15. An end cap 16 of the housing 12 is mounted to the rear end of the housing 12 to close the open end 15. An armature assembly, generally indicated at 18, is supported for rotational movement within the housing 12 by front and rear bearing structures 20 and 22. Motor 10 further includes a brush card assembly, generally indicated at 24, mounted adjacent to the end cap 16, and a commutator 26 which cooperates with the brush card assembly 24 to supply electric current to the armature assembly 18. A mounting flange 28 is coupled to the housing 12 for mounting the motor 10 to a supporting portion of a vehicle. The end cap 16 includes a cut-out portion 30 which corresponds with the housing 12 to accommodate an electrical connector 32.

With reference to FIG. 1, the armature assembly 18 includes a shaft 34 and an armature 36 mounted about the shaft 34. The shaft 34 consists of shaft end sections 38 and 40, supported by bearing structures 20 and 22, and an intermediate shaft section 42. Armature 36 may be any conventional armature and consists of an armature core having a number of stacked laminations with insulation-coated wire windings wound thereabout. The laminations may he treated with inductive heating if desired. Armature 36 is coaxially mounted about shaft 34. A mounting plate (not shown) may be provided for structural connection of the armature core and windings to the intermediate shaft section 42. Armature 36 is in electrical contact with commutator 26 and rotates in response to a magnetic field generated by permanent magnets 44 mounted within housing 12. Armature 36 may be axially centered relative to the magnets 44 or may be off-center with respect to the magnets 44 whereby the armature 36 is pre-loaded to one side.

The brush card assembly 24 includes a brush support member 46 having a pair of mounting posts 48 extending therefrom. The brush support member 46, preferably made of plastic, is coupled to the end cap 16. A brush assembly 50 is carried by a respective mounting post 48. In the illustrated embodiment, each brush assembly 50 includes a brush positioned to be in contact with the commutator 26 in the conventional manner.

Figure 3:
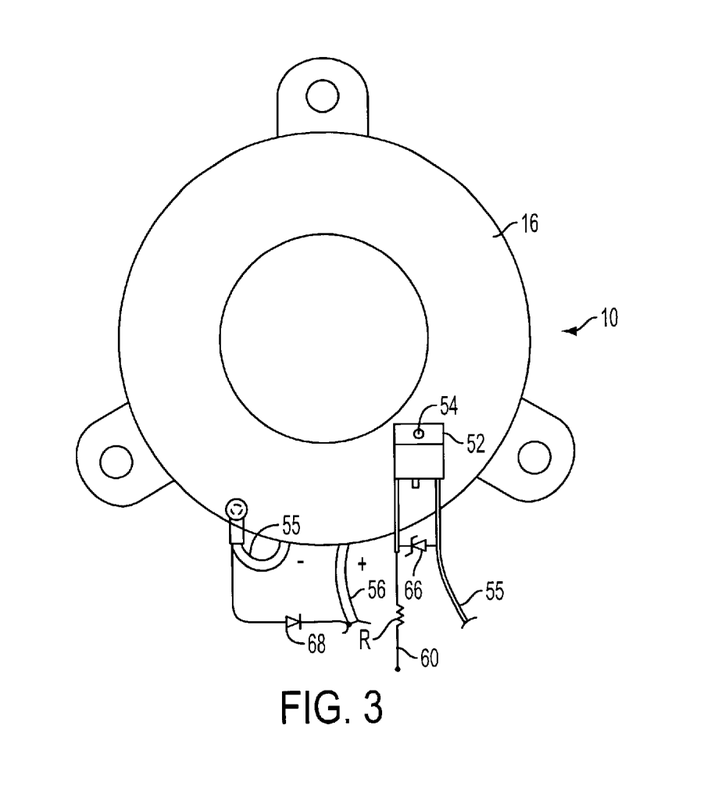
FIG. 3 is a schematic view of an end cap of a motor of the invention showing a MOSFET coupled thereto.

In accordance with the invention and with reference to FIGS. 1 and 3, a heat transfer surface of a MOSFET 52 is mounted directly to the end cap 16 or other housing portion of the motor which is disposed substantially transverse with respect to a rotational axis of the armature assembly 18. In the embodiment of FIG. 1, the MOSFET 52 is mounted to the outside surface of the end cap 16. A pop-rivet 54 is used to secure the MOSFET 52 to the end cap 16. Alternatively, the MOSFET 52 can be mounted via a screws, a clip and/or with adhesive. Preferably, a thermal compound 53 is provided between the MOSFET 52 and the end cap 16, to promote heat transfer from the MOSFET 52 to the end cap 16.

Figure 2:
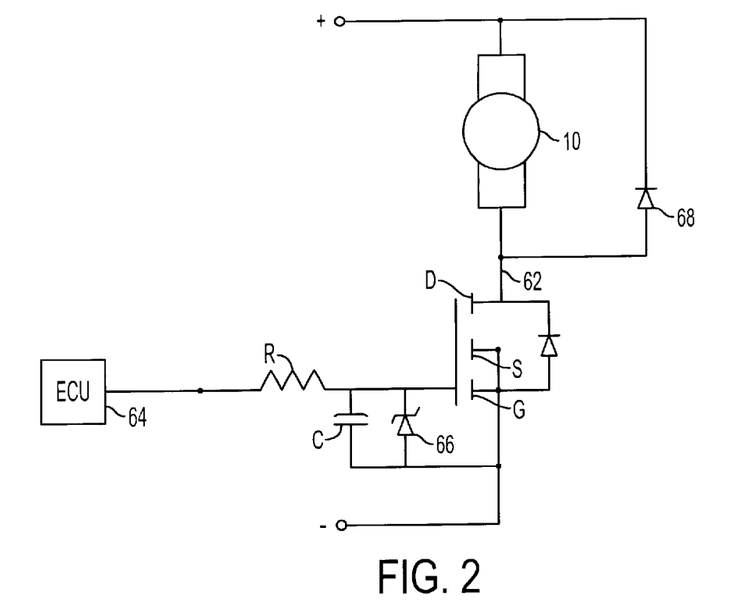
FIG. 2 is a schematic illustration of a circuit of the motor of FIG. 1 shown electrically coupled to an electronic control unit of a vehicle.

As seen in FIGS. 2 and 3, the negative motor lead 55 is secured to the metal end cap 16. Only three lead wires stem from the motor 10: positive lead 56, negative lead 55 and control signal lead 60. The MOSFET drain terminal D is connected to the negative brush card assembly lead of the motor 10 via a lead wire 62. The MOSFET source terminal S is connected to ground or the negative motor terminal. The MOSFET gate terminal G is connected to a PWM output from the vehicle's ECU 64. The ECU 64 is constructed and arranged to generate a varying PWM signal based on the load requirement of the motor which is sent directly to the gate terminal G. This allows not only two speed motor operation, but a multiple of motor speed operations are available.

With reference to FIG. 3, a zener diode 66 is provided between the gate G and drain D of the MOSFET 52 to protect the MOSFET from over-voltage transients when the MOSFET is switched under a heavy load. A resistor R is provided in series with the MOSFET gate G to protect the ECU output stage from failure due to rapid charging and discharging of the MOSFET gate G. A free-wheeling diode 68 is provided between the positive and negative terminals of the motor 10. The zener diode 66, resistor R and free-wheeling diode 68 can be mounted on the brush card assembly 24 of the motor 10, or provided in a separate connector structure as will be described with regard to a second embodiment of the invention. It can be appreciated that no relays or switches are required since the MOSFET acts as the switch applying current to the motor windings based on the PWM signal received.

The motor 10 can be controlled by a low frequency PWM signal (50 to 400 HZ typical). The switching frequency, however, is not limited to lower frequencies. If the control circuitry and the heatsinking of the MOSFET are modified, higher frequencies could be used.

The low frequency PWM signal can be delivered to the motor using the output of the ECU or, if full speed operation of the motor is desired, the speed input to the motor can be achieved using temperature and/or temperature sensors.

The low frequency PWM signal can be modulated in such a manner to avoid mechanical resonance. For example, if the fundamental PWM frequency is 50 Hz, the PWM frequency can be modulated 5 Hz on either side of 50 Hz in a random, or pseudo random fashion.

For starting conditions, a soft feature can be implemented by ramping up the PWM duty cycle from 0% to the desired PWM duty cycle. In order to ensure a gradual increase in current through the switching device, a capacitor C (FIG. 2) can be connected from the gate of the MOSFET to ground. The capacitor, in addition to the series resistor R, acts as a low pass filter in series with the MOSFET gate G. If the PWM frequency is high enough, the linear increase in the MOSFET gate voltage would result in a gradual increase in the MOSFET drain current. This increase in the MOSFET drain current would occur until the motor back EMF is built-up to the desired running speed, at which point the motor switches to a lower frequency PWM signal to control the speed of the motor.

Figure 4:
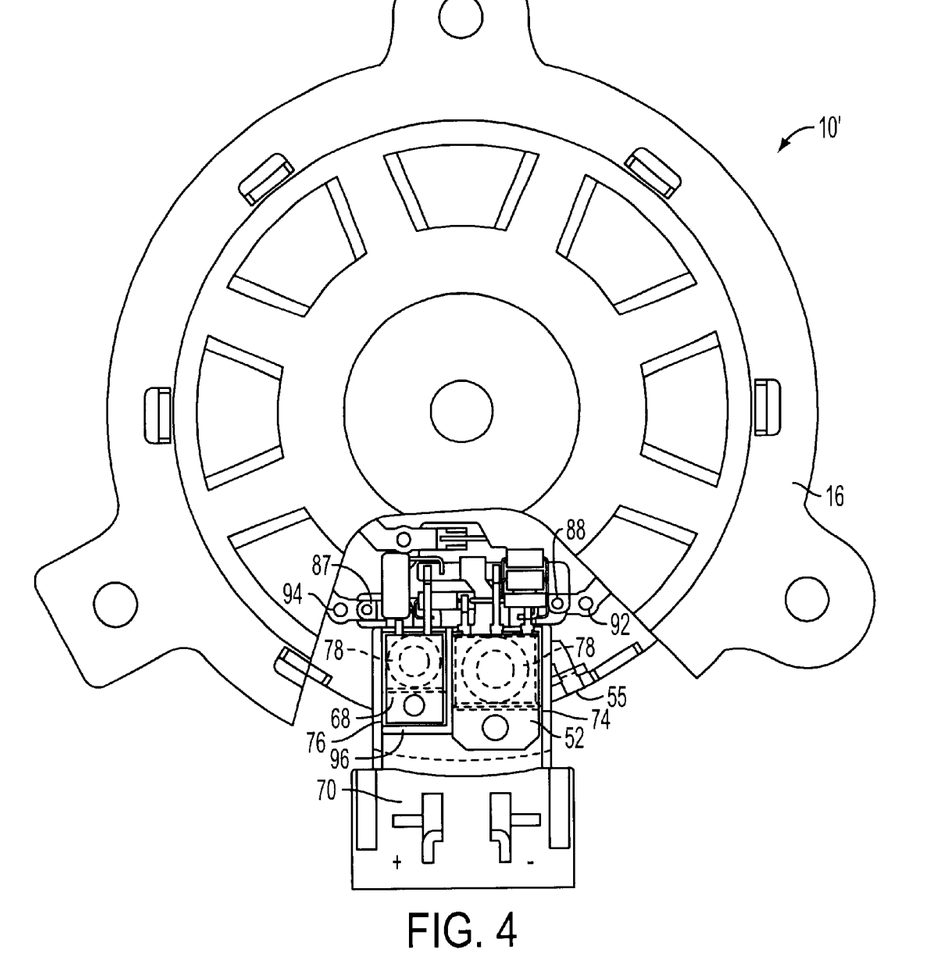
FIG. 4 is a end view of a motor of a second embodiment of the invention showing connector structure with integrated MOSFET.
Figure 5:
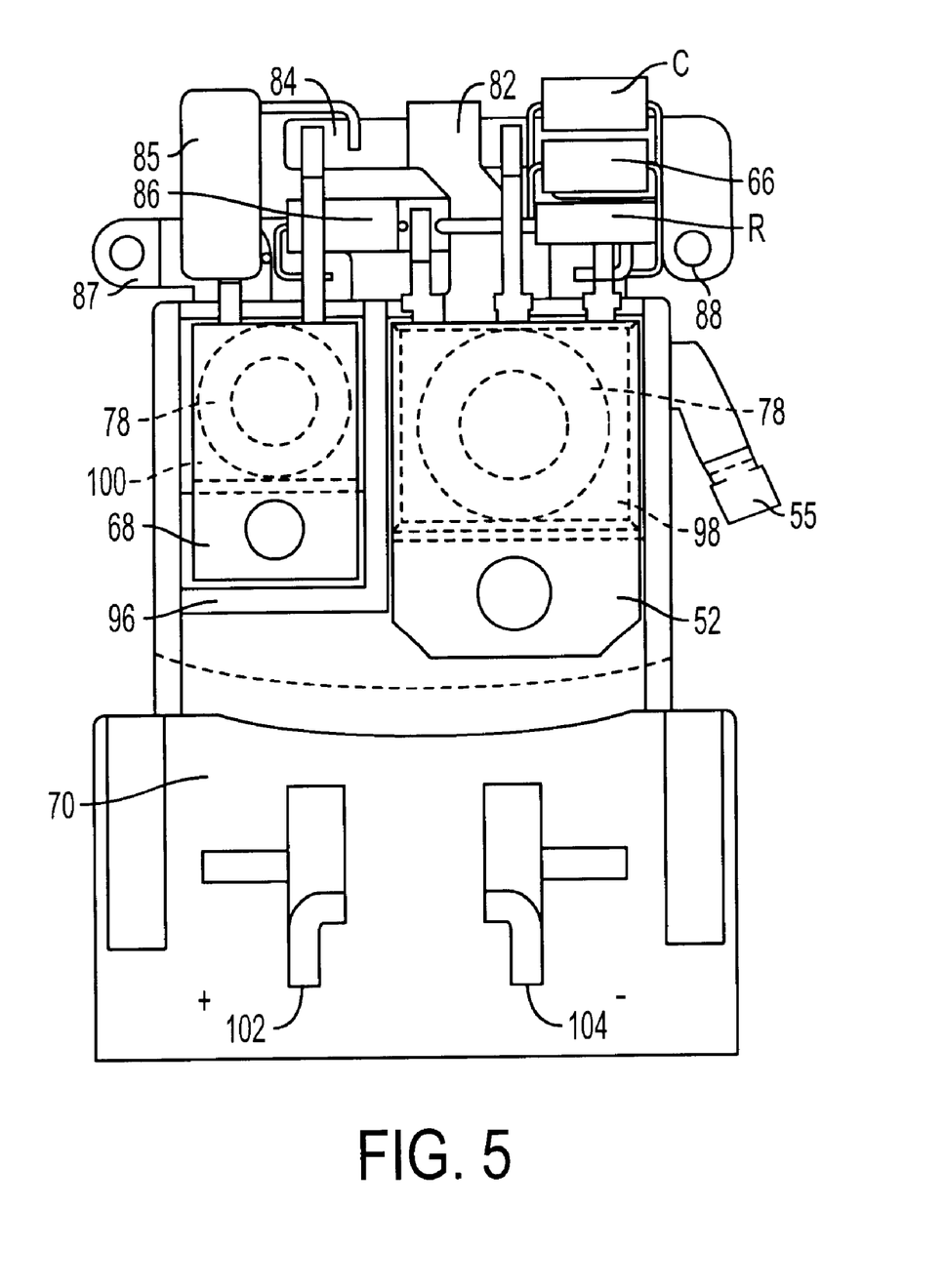
FIG. 5 is an enlarged view of the connector structure of FIG. 4.
Figure 6:
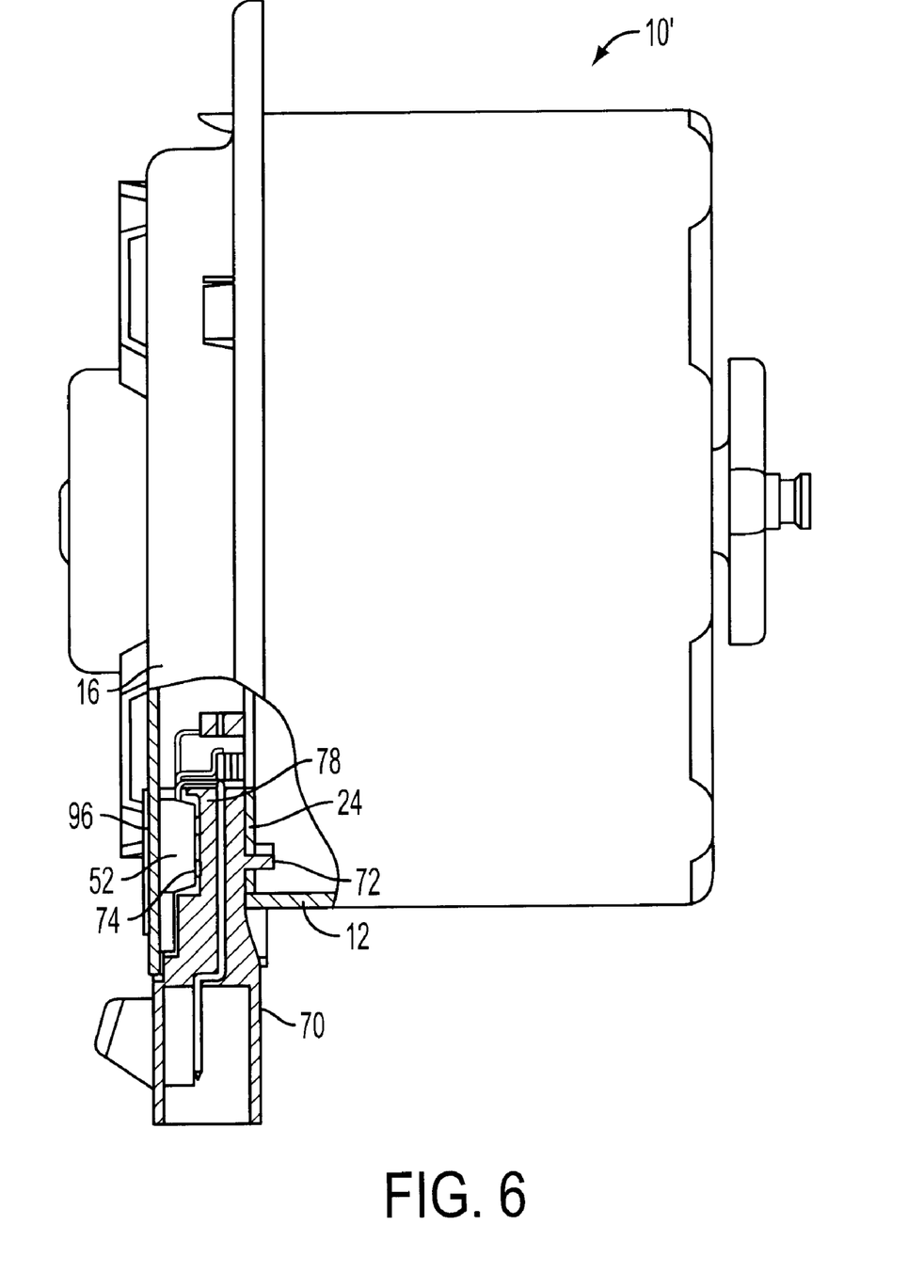
FIG. 6 is a side view, partially in section, of the motor of FIG. 4.

A second embodiment of the invention is shown in FIGS. 4–6 which enables the assembly of the MOSFET 52 with respect to the end cap 16 to be made easily. The motor 10' of the second embodiment of the invention includes a commutator, armature, and permanent magnets in the manner disclosed with regard to the motor of FIG. 1. Thus, these components are not shown in FIGS. 4–6. With reference to FIGS. 4 and 6, the motor 10' includes connector structure 70 disposed within end cap 16 and coupled to the brush card assembly 24 via tab 72. In the broadest aspect of the invention, the connector structure 70 may be considered to be part of the end cap 16. A surface of the connector structure 70 includes recesses 74 and 76 therein defining mounting surfaces for receiving the MOSFET 52 and free-wheeling diode 68, respectively. Spring structure in the form of a wave washer 78 is provided between the diode 68 and a mounting surface of the recess 76 and between the MOSFET 52 and a mounting surface of recess 74, the function of which will be explained below.

As best shown in FIG. 5, the connector structure 70 includes a bus bar support 82 which supports controller bus bar 84. The connector structure 70 carries an RFI capacitor 85, resistor 86, capacitor C, resistor R, and zener diode 66. The connector structure 70 also includes a positive terminal 87, a negative terminal 88, and ground/negative terminal 55, which is connected to the end cap 16 (FIG. 4). As best shown in FIG. 4, once the MOSFET 52 end diode 68 are inserted into the associated recess and electrically connected in the manner as shown in FIG. 2, the negative terminal 88 is connected to the negative bus bar 92 of the brush card assembly 24, and the positive terminal 87 is connected to the positive bus bar 94 of the brush card assembly 24. Power to the motor is provided to the positive motor terminal 102 and negative motor terminal 104 of the connector structure 70.

As shown in FIGS. 4 and 6, a generally L-shaped partition 96 is provided to physically separate the MOSFET 52 from the diode 68. The partition 96 extends past an opening in the end cap 16 and thus divides the end cap 16 into two separate heat exchange zones: one zone being associated with the diode 68 and the other zone being associated with the MOSFET 52.

In the embodiment of FIG. 4, the MOSFET 52 is disposed inside of the end cap 16. A thin, electrically insulating thermal compound or film (not shown) is provided between the inside surface of the end cap 16 and the heat exchange surfaces 98 and 100 of the MOSFET 52 and diode 68, respectively.

Thus, an integrated assembly is achieved by placing the MOSFET 52 and diode 68 into the associated recesses 74 and 76 of the connector structure 70. This placement eliminates additional component locating devices and positions the diode 68 and MOSFET 52 terminals on the connector bus bars 92 and 94, as well as on the controller bus bar 84. When assembled, the wave washers 78 maintain a constant pressure of the heat exchange surfaces 98 and 100 of the MOSFET 52 and diode 68, respectively, on the inside surface of the end cap 16. Thus, heat of the diode 68 and MOSFET 52 is transferred to the body of the motor end cap 16.

Figure 7:
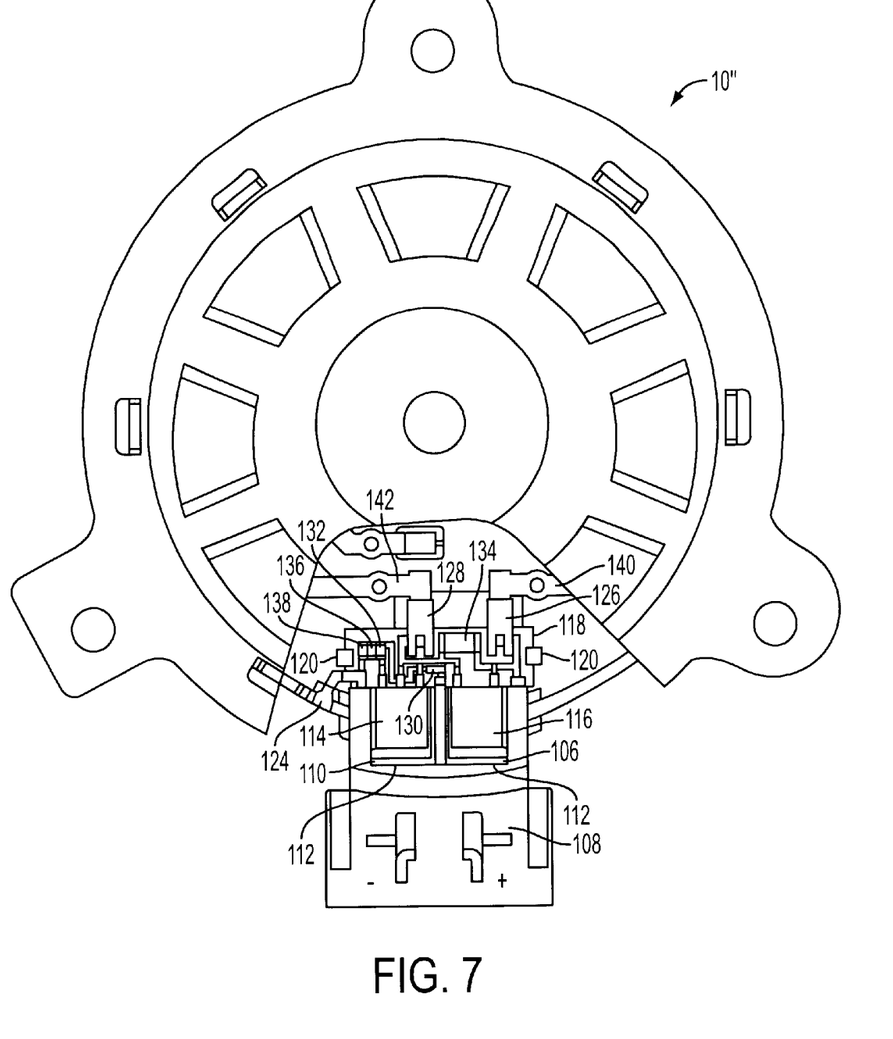
FIG. 7 is a end view of a motor of a third embodiment of the invention showing a heat sink with integrated MOSFET.
Figure 8:
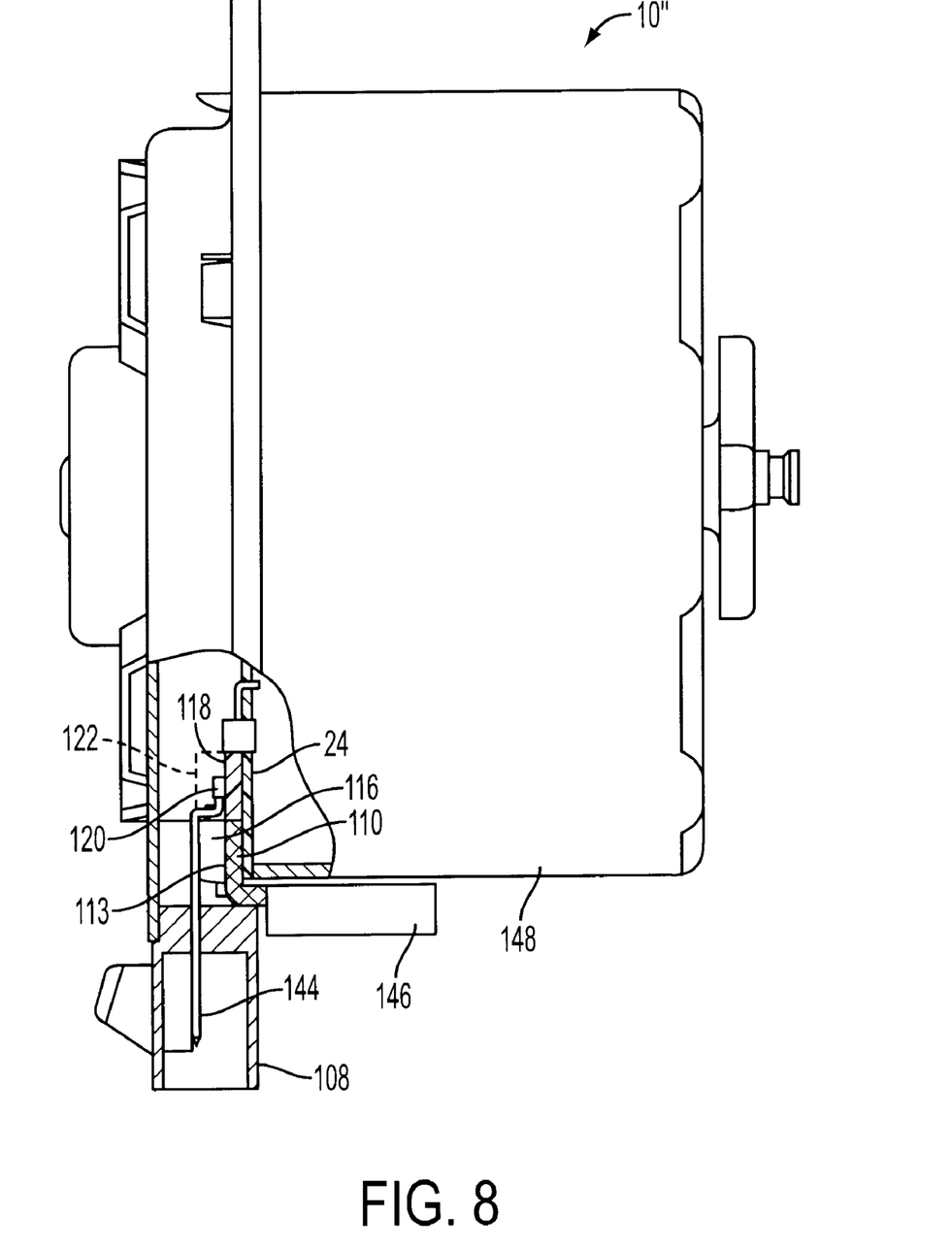
FIG. 8 is a side view, partially in section, of the motor of FIG. 7.

A third embodiment of the invention is shown in FIGS. 7 and 8 which can be employed in motors which operate from about 400 to 600 Watts. The motor 10" of the third embodiment of the invention includes a commutator, armature, and permanent magnets in the manner disclosed with regard to the motor of FIG. 1. Thus, these components are not shown in FIGS. 7 and 8. With reference to FIGS. 7 and 8, the motor 10" includes a heat sink 106 which is coupled to an electrical connector 108 by slipping a portion of the heat sink 106 into grooves in the electrical connector 108. This eliminates the need for an additional heat sink locating device. The heat sink 106 includes a mounting portion 110 including a pair of recesses 112. A heat conducting surface of a MOSFET 114 is mounted to a surface defining one recess 112 via heat conducting and electrically insulating adhesive 113. Further, a heat conducting surface of a free-wheeling diode 116 is coupled to a surface defining the other recess 112 via the same heat conducting and electrically insulating adhesive 113. A printed circuit board 118 is mounted with respect to the mounting portion 110 of the heat sink 106. In the illustrated embodiment, brackets or tabs 120 space the circuit board from the mounting portion 110 of the heat sink 106. The dashed line 122 in FIG. 8 shows the extent of the components mounted on the circuit board 118. A ground terminal 124, a positive terminal 126 and a negative terminal 128 are carried by the circuit board 118. The circuit board 118 also carries resistors 130, 132, an RFI capacitor, 134, a zener diode, 136 and a capacitor 138. The MOSFET 114 and free wheeling diode 116 are also electrically connected to the circuit board 118. The positive terminal 126 is electrically connected to the positive bus bar 140 of the brush card assembly 24 (FIG. 8) and the negative terminal 128 is coupled to the negative bus bar 142 of the brush card assembly 24. Three electrical leads 144 extend from the circuit board 118 to the connector 108. Two leads are used to power the motor 10' and one lead is used to receive the pulse width modulated control signal from the ECU to be sent to the MOSFET 114.

The motor 10" is constructed and arranged to operate a cooling fan of a vehicle. Thus, with reference to FIG. 8, the heat sink includes fins 146 which are coupled to the heat sink mounting portion 110 and which extends from the motor housing 148. The fins 146 are thus positioned to be in the airflow stream of the fan (not shown) so as to be cooled by the airflow. Thus, heat generated by the MOSFET 114 and free-wheeling diode 116 is transferred to the heat sink mounting portion 110 and the heat is transferred to the fins 146.

The motors 10' and 10' operate in the same manner as the motor 10 of FIG. 1 in that a PWM signal from a remotely located engine control unit is sent to the gate terminal of the MOSFET 52 to control the speed of the motors 10' and 10".

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An electric motor comprising:
   a motor housing defining an internal cavity;
   a brush card assembly, a commutator and an armature assembly in said cavity, said commutator cooperating with said brush card assembly to supply electric current to said armature assembly,
   permanent magnet structure in said housing generating a magnetic field to cause rotation of said armature assembly; and a FET mounted directly to a portion of said housing so as to be in heat exchange relation therewith, said housing portion being disposed substantially transverse with respect to a rotational axis of the armature assembly, wherein said housing portion is a metal end cap closing said cavity, said FET being mounted directly to said end cap.

2. The motor according to claim 1, wherein said FET is a metal oxide semiconductor field effect transistor.

3. The motor according to claim 1, further comprising a connector structure carrying said FET and spring structure between said connector structure and said FET, said spring structure causing a heat transfer surface of said FET to be in contact with a surface of said end cap.

4. The motor according to claim 3, further comprising a free-wheeling diode connected between a positive bus bar and a negative bus bar of said brush card assembly, and wherein the connector structure carries said free-wheeling diode, second spring structure being provided between said connector structure and said free-wheeling diode, said second spring structure causing a heat transfer surface of said free-wheeling diode to be in contact with said surface of said end cap.

5. The motor according to claim 3, wherein said spring structure comprises a wave washer.

6. The motor according to claim 3, wherein said connector structure includes a negative terminal coupled to the negative bus bar of said brush card assembly, and a positive terminal connected to the positive bus bar of said brush card assembly.

7. The motor according to claim 4, wherein a partition physically separates said free-wheeling diode from said FET, said partition being constructed and arranged to divide said surface of said end cap into two separate heat exchange zones such that heat of said FET may be transferred to one of said zones and heat of said free-wheeling diode may be transferred to another of said zones.

8. The motor according to claim 4, wherein said connector structure includes recesses for receiving said free-wheeling diode and said FET therein, said spring structure being disposed between surfaces defining said recesses and surfaces of said FET and said free-wheeling diode.

9. The motor according to claim 3, wherein said connector structure includes positive and negative motor power terminals.

10. The motor according to claim 1, further comprising a thermal compound between the FET and said housing portion.

11. The motor according to claim 1, wherein a gate terminal of said FET is constructed and arranged to receive a pulse width modulated output directly from an electronic control unit to be disposed remote from the motor so as to enable able the motor to operate at more than one speed.

12. An electric motor comprising:
a motor housing defining an internal cavity;
a brush card assembly, a commutator and an armature assembly in said cavity, said commutator cooperating with said brush card assembly to supply electric current to said armature assembly,
permanent magnet structure in said housing generating a magnetic field to cause rotation of said armature assembly;
a FET mounted directly to a portion of said housing so as to be in heat exchange relation therewith, said housing portion being disposed substantially transverse with respect to a rotational axis of the armature assembly; and
a zener diode between a gate terminal and a drain terminal of said FET.

13. The motor according to claim 12, further comprising a free-wheeling diode between a positive bus bar and a negative bus bar of said brush card assembly.

14. An electric motor comprising:
a motor housing defining an internal cavity;
a brush card assembly, a commutator and an armature assembly in said cavity, said commutator cooperating with said brush card assembly to supply electric current to said armature assembly,
permanent magnet structure in said housing generating a magnetic field to cause rotation of said armature assembly;
a FET mounted directly to a portion of said housing so as to be in heat exchange relation therewith, said housing portion being disposed substantially transverse with respect to a rotational axis of the armature assembly; and
a resistor in series with a gate terminal of said FET.

15. An electric motor comprising:
a motor housing defining an internal cavity;
a brush card assembly, a commutator and an armature assembly in said cavity, said commutator cooperating with said brush card assembly to supply electric current to said armature assembly,
permanent magnet structure in said housing generating a magnetic field to cause rotation of said armature assembly;
a FET mounted directly to a portion of said housing so as to be in heat exchange relation therewith, said housing portion being disposed substantially transverse with respect to a rotational axis of the armature assembly; and
a capacitor connected from a gate terminal of said FET to electrical ground.

16. An electric motor comprising:
a motor housing defining an internal cavity;
a brush card assembly, a commutator and an armature assembly in said cavity, said commutator cooperating with said brush card assembly to supply electric current to said armature assembly,
permanent magnet structure in said housing generating a magnetic field to cause rotation of said armature assembly; and
a FET mounted directly to a portion of said housing so as to be in heat exchange relation therewith, said housing portion being disposed substantially transverse with respect to a rotational axis of the armature assembly,
wherein said FET is coupled to said housing by a rivet.

17. An electric motor comprising:
a motor housing defining an internal cavity;
a brush card assembly, a commutator and an armature assembly in said cavity, said commutator cooperating with said brush card assembly to supply electric current to said armature assembly,
permanent magnet structure in said housing generating a magnetic field to cause rotation of said armature assembly; and
a FET having a gate terminal constructed and arranged to receive a pulse width modulated output directly from an electronic control unit to be disposed remote from the motor so as to enable the motor to operate at more than one speed, wherein the housing includes a metal end cap closing said cavity, said FET being mounted directly to said end cap.

18. The motor according to claim 17, wherein said FET is a metal oxide field effect transistor.

19. An electric motor comprising:
a motor housing defining an internal cavity;
a brush card assembly, a commutator and an armature assembly in said cavity, said commutator cooperating with said brush card assembly to supply electric current to said armature assembly,
permanent magnet structure in said housing generating a magnetic field to cause rotation of said armature assembly;
a FET having a gate terminal constructed and arranged to receive a pulse width modulated output directly from an electronic control unit to be disposed remote from the motor so as to enable the motor to operate at more than one speed; and
a zener diode between the gate terminal and a drain terminal of said FET.

20. An electric motor comprising:
a motor housing defining an internal cavity;
a brush card assembly, a commutator and an armature assembly in said cavity, said commutator cooperating with said brush card assembly to supply electric current to said armature assembly,
permanent magnet structure in said housing generating a magnetic field to cause rotation of said armature assembly;
a FET having a gate terminal constructed and arranged to receive a pulse width modulated output directly from an electronic control unit to be disposed remote from the motor so as to enable the motor to operate at more than one speed; and
a resistor in series with said gate terminal of said FET.

21. The motor according to claim 19, further comprising a free-wheeling diode between a positive bus bar and a negative bus bar of said brush card assembly.

22. An electric motor comprising:
a motor housing defining an internal cavity;
a brush card assembly, a commutator and an armature assembly in said cavity, said commutator cooperating with said brush card assembly to supply electric current to said armature assembly,
permanent magnet structure in said housing generating a magnetic field to cause rotation of said armature assembly;
a FET having a gate terminal constructed and arranged to receive a pulse width modulated output directly from an electronic control unit to be disposed remote from the motor so as to enable the motor to operate at more than one speed; and
a capacitor connected from the gate terminal of said FET to electrical ground.

23. A method of controlling speed of an electric motor, the motor comprising a motor housing defining an internal cavity; a brush card assembly, a commutator and an armature assembly being disposed in said cavity, said commutator cooperating with said brush card assembly to supply electric current to said armature assembly, permanent magnet structure in said housing generating a magnetic field to cause rotation of the armature assembly; and a FET mounted with respect to a portion of said housing so as to be in heat exchange relation therewith, the method including:

connecting a drain terminal of said FET to a negative lead of said brush card assembly,
connecting a source terminal of said FET to a ground terminal or a negative terminal of said motor,
connecting a gate terminal of said FET to a pulse width modulated output of an electronic control unit which is located remote from said motor; and
sending a pulse width modulated signal directly from said electronic control unit to said FET to control a speed of said motor.

24. The method according to claim 23, wherein said electronic control unit is a control unit of a vehicle, the pulse width modulated signal sent from said electronic control unit being based on a load requirement of said motor.

25. A method of assembling a motor having integrated speed control, comprising:
providing a direct current motor comprising a motor housing defining an internal cavity; a brush card assembly, a commutator and an armature assembly being disposed in said cavity, said commutator cooperating with said brush card assembly to supply electric current to said armature assembly, permanent magnet structure in said housing generating a magnetic field to cause rotation of the armature assembly;
providing a connector structure connected to said motor, said connector structure having a negative terminal and a positive terminal, said connector structure having mounting surfaces, each of said mounting surfaces including spring structure associated therewith,
placing a FET on a spring structure such that said spring structure is disposed between a surface of said FET and an associated mounting surface,
electrically connecting said FET to said motor,
placing a free-wheeling diode on the other of said spring structures such that said other spring structure is disposed between a surface of said free-wheeling diode and an associated mounting surface,
electrically connecting said free-wheeling diode between said negative and positive terminals,
electrically connecting said negative terminal to a negative bus bar of said brush card assembly, and electrically connecting said positive terminal to a positive bus bar of said brush card assembly; and
placing an end cap on said motor to close said cavity, with said spring structure forcing a surface of said free-wheeling diode and a surface of said FET into contact with a surface of said end cap such that heat generated by said FET and said free-wheeling diode is transferred to said end cap.

26. The method according to claim 25, wherein a partition physically separates said FET from said free-wheeling diode, said partition dividing said surface of said end cap into two zones such that heat from said FET is transferred to one zone while heat from said free-wheeling diode is transferred to the other zone.

27. The method according to claim 25, wherein the step of electrically connecting said FET includes connecting a gate terminal of said FET to a pulse width modulated output of an electronic control unit located remote from said motor.

28. A method of integrating a FET into a motor, comprising:
providing a direct current motor comprising a motor housing defining an internal cavity; a brush card assembly, a commutator and an armature assembly being disposed in said cavity, said commutator cooperating with said brush card assembly to supply electric current to said armature assembly, permanent magnet structure in said housing generating a magnetic field to cause rotation of the armature assembly;

providing a connector structure connected to said motor, said connector structure having a mounting surface, said mounting surface including spring structure associated therewith, placing the FET on the spring structure such that said spring structure is disposed between a surface of said FET and the mounting surface, electrically connecting said FET to said motor, and placing an end cap on said motor to close said cavity such that said spring structure forces a surface of said FET into contact with a surface of said end cap whereby heat generated by said FET is transferred directly to said end cap.

29. The method according to claim 28, wherein the step of electrically connecting said FET includes connecting a gate terminal of said FET to a pulse width modulated output of an electronic control unit located remote from said motor.

30. An electric motor comprising:

a motor housing defining an internal cavity;

a brush card assembly, a commutator and an armature assembly in said cavity, said commutator cooperating with said brush card assembly to supply electric current to said armature assembly, permanent magnet structure in said housing generating a magnetic field to cause rotation of said armature assembly;

a heat sink having a mounting portion disposed generally adjacent to said brush card assembly; and a FET mounted directly to said mounting portion of said heat sink so as to be in heat exchange relation therewith, a gate terminal of said FET being constructed and arranged to receive a pulse width modulated output directly from an electronic control unit to be disposed remote from the motor so as to enable the motor to operate at more than one speed.

31. The motor according to claim 30, wherein said mounting portion of said heat sink includes a recess therein, a surface of said FET being coupled to a surface of said recess by heat conductive adhesive.

32. The motor according to claim 30, wherein said neat sink is coupled to an electrical connector, said connector being constructed and arranged to provide power to said motor.

33. The motor according to claim 30, wherein said mounting portion of said heat sink includes a pair of recess therein, said motor including a free-wheeling diode connected between a positive bus bar and a negative bus bar of a said brush card assembly a surface of said FET being coupled to a surface of one of said recesses by heat conductive adhesive and a surface of said free-wheeling diode being coupled to a surface of the other of said recesses by heat conductive adhesive.

34. The motor according to claim 30, wherein a circuit board is mounted with respect to said mounting portion of said heat sink, said FET being electrically connected to said printed circuit board.

35. The motor according to claim 30, wherein said motor is constructed and arranged to operate a cooling fan of a vehicle, said heat sink including fins coupled to said mounting portion of said heat sink and extending outside of said motor housing so a as to be a stream of airflow of a fan.

36. The motor according to claim 34, wherein said circuit board is electrically connected to a positive bus bar and a negative bus bar of said brush card assembly.

37. A method of integrating a speed control into a motor, comprising:

providing a direct current motor comprising a motor housing defining an internal cavity; a brush card assembly, a commutator and an armature assembly being disposed in said cavity, said commutator cooperating with said brush card assembly to supply electric current to said armature assembly, permanent magnet structure in said housing generating a magnetic field to cause rotation of the armature assembly, and a heat sink having a mounting portion, disposed generally adjacent to said brush card assembly, the method including:

mounting the FET on said mounting portion of said heat sink;

mounting a circuit board with respect to said mounting portion of said heat sink;

mechanically coupling said heat sink to an electrical connector;

electrically connecting said FET and said brush card assembly to said circuit board; and providing leads from said circuit board to said electrical connector to power said motor and to receive a pulse width modulated control signal to be sent to said FET.

38. The method according to claim 37, wherein said FET is mounted to said mounting portion by heat conductive adhesive.

39. The method according to claim 37, wherein said heat sink is disposed in grooves in said electrical connector.

40. The method according to claim 37, wherein said motor is constructed and arranged to operate a cooling fan of a vehicle, said heat sink including fins coupled to said mounting portion of said heat sink and extending outside of said motor, the method including positioning said fins so as to be in a stream of airflow of the cooling fan.

* * * * *